June 22, 1943. P. F. SPERRY ET AL 2,322,399
CAMERA AND VIEW FINDER MEANS THEREFOR
Filed Oct. 30, 1941 2 Sheets-Sheet 1
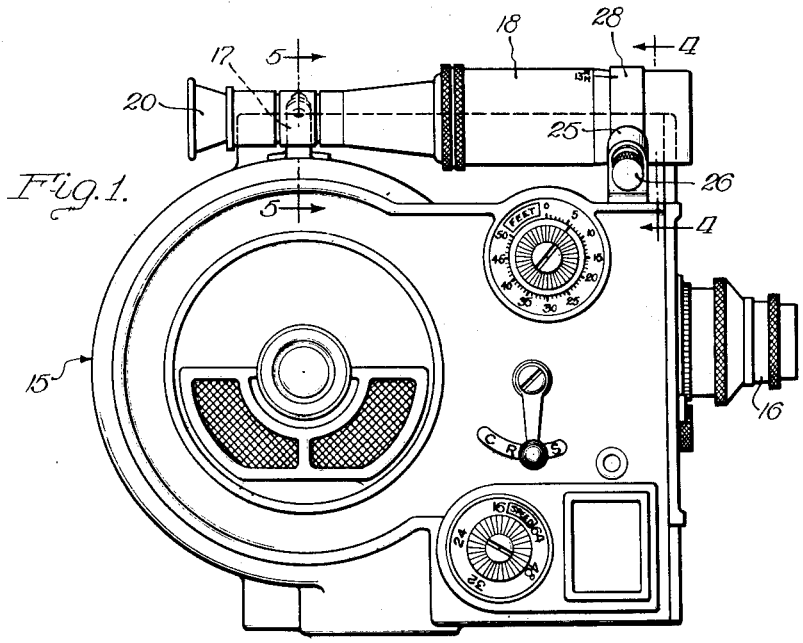
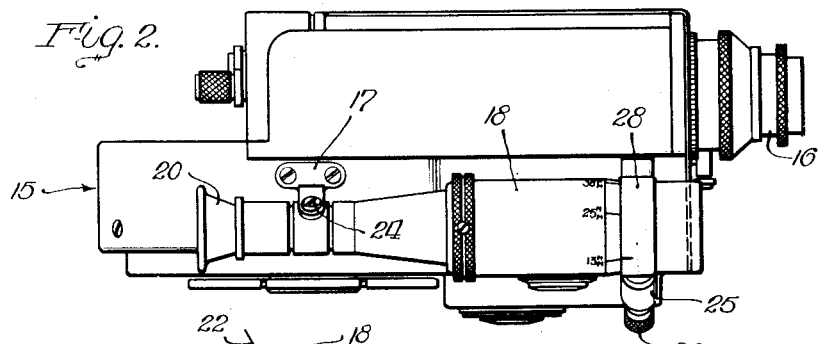
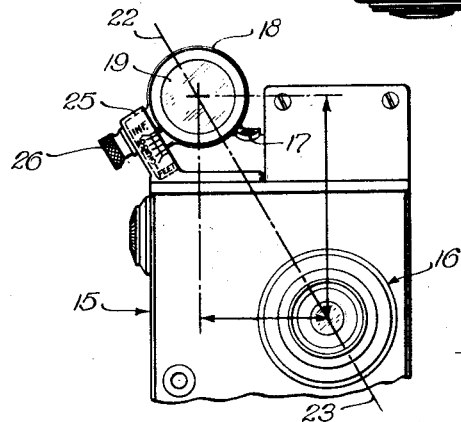
Inventors:
Philmore F. Sperry
Philip F. Briskin
Jack Briskin June 22, 1943.  P. F. SPERRY ET AL  2,322,399
CAMERA AND VIEW FINDER MEANS THEREFOR
Filed Oct. 30, 1941  2 Sheets-Sheet 2
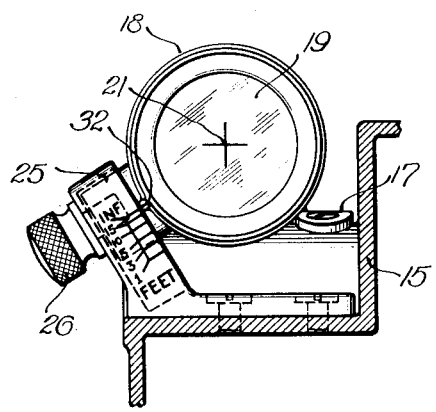
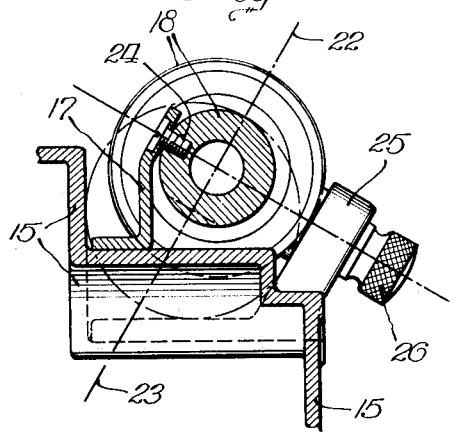
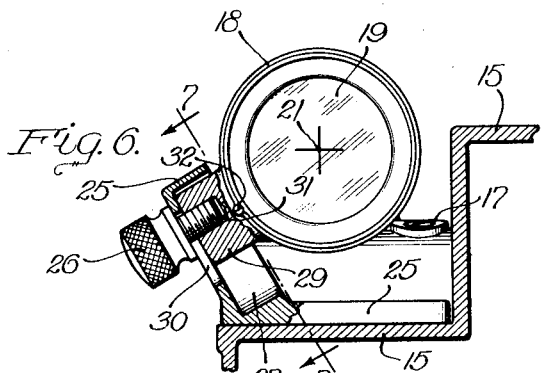
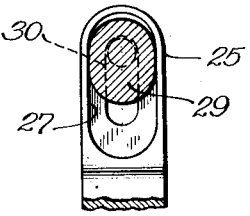
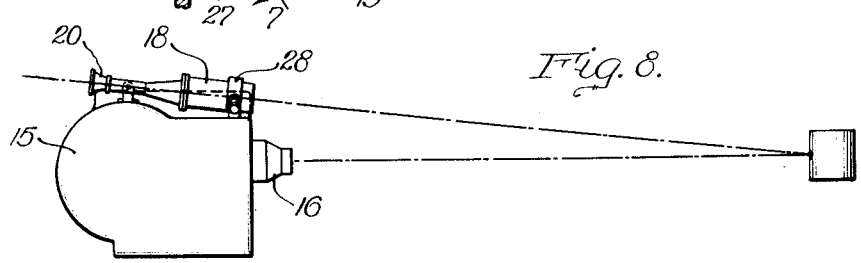
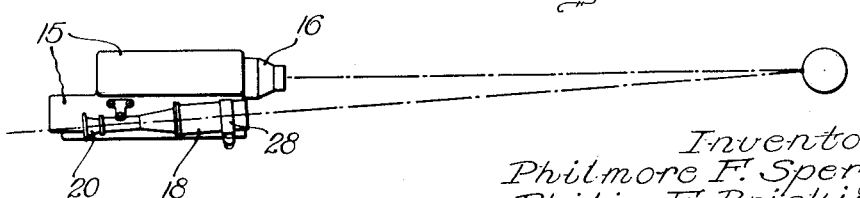
Inventors:
Philmore F. Sperry
Philip F. Briskin
Jack Briskin
By: Jabel Carlson Griffaugh & Wells
Attys.

Patented June 22, 1943

2,322,399

UNITED STATES PATENT OFFICE 2,322,399

CAMERA AND VIEW FINDER MEANS THEREFOR

Philmore F. Sperry, Philip F. Briskin, and Jack Briskin, Chicago, Ill.; Helen B. Sperry, executrix of the estate of said Sperry, deceased; said executrix assignor, by mesne assignments, to Theodore H. Briskin, Philip F. Briskin, and Jack Briskin Application October 30, 1941, Serial No. 417,080

3 Claims. (Cl. 88—1.5)

This invention relates to cameras and view finder means therefor, and it has for its principal object the provision of improved mounting means for a view finder by the use of which the angular position of the finder may be adjusted with respect to the optical axis of the camera as the distance between the camera and the object being photographed is changed. As is fully appreciated by those skilled in the photographic art, the parallax effect involved in the difference in the view through the lens system of the camera and the separate lens system of a finder arranged in parallel relation to the camera changes substantially as the distance of the camera from the object being photographed is reduced for close-ups. As a result of this difference in the parallax effect which must be taken into account by the operator, it is very difficult for any other than a highly experienced operator to obtain uniformly good results when changing from normal distance photography to close-up work or the reverse—particularly when using a moving picture camera. By the use of the improvements comprising this invention, by which the finder is adjusted angularly with respect to the camera from time to time as may be necessary so as to cause the axis of the lens system of the finder to intersect the axis of the lens system of the camera directly at the face of the object being photographed, any possible difficulty on the part of the operator with respect to changing from one type of work to another in the use of the camera is very substantially reduced, and the efficiency of the photographic work is correspondingly increased.

In the preferred construction for bringing about the desired results, the finder is pivotally connected with the camera in such manner that the optical axis of the finder and the optical axis of the camera lie in a common plane, the axis upon which the finder and the camera are connected together being at right angles to such common plane so as to maintain this desired relationship of the parts as the finder is adjusted angularly with respect to the camera. Thus the axis of one lens system is caused to intersect the axis of the other lens system always in this common plane but at different distances from the camera corresponding to the distance of the camera from the object being photographed. In this way the center of the field of view of the finder is made to coincide always with the center of the field effectively covered by the lens system of the camera.

For expediting the adjustment of the finder with respect to the camera for bringing about this result, graduated means is provided by reference to which the finder can be readily and quickly set at the desired angle, the graduations being preferably calibrated in terms of feet or other units representing the distance between the camera and the object being photographed.

It is another object of this invention to improve devices of this type in sundry details hereinafter pointed out. The preferred means by which the several objects have been attained are illustrated in the accompanying drawings, in which—

Fig. 1 is a side face view of a camera equipped with the improved view finder means of this invention;

Fig. 2 is a top plan view of the parts shown in Fig. 1;

Fig. 3 is a front face view of the upper portion of the structure as shown in Fig. 2;

Figs. 4 and 5 are vertical cross sectional views through the finder, being taken on an enlarged scale substantially at the line 4—4 and the line 5—5, respectively, of Fig. 1;

Fig. 6 is a view similar to Fig. 4 but with a portion of the supporting bracket for the finder broken away;

Fig. 7 is a sectional view taken substantially at the line 7—7 of Fig. 6; and

Figs. 8 and 9 are diagrammatic views representing in elevation and in plan a single adjusted position of the finder with respect to the camera.

Referring now to the several figures of the drawings, in which corresponding parts are in-indicated by the same reference characters, 15 indicates a moving picture camera of any approved type provided with the system of lenses comprising an objective 16 as usual, the optical axis of the camera being slightly above the middle of the camera as shown in Fig. 1 and well toward one side of the camera as shown in Fig. 3. The lens system of the camera is of any approved type.

As is best shown in Fig. 5, the housing of the camera 15 is provided on its upper face with a bracket 17 for supporting a view finder 18 of any suitable type in position above the camera at one side of the optical axis of the camera, as is clearly shown in Fig. 3. The finder 18 as shown is elongated so as to extend substantially the full length of the camera, being provided with an objective 19 at its front end and an eyepiece 20 at the rear end of any suitable form. It will be understood that the optical axis of the finder 18 is located concentrically with respect to the tubular body structure of the finder—in other words, at the point 21 in Figs. 4 and 6.

Means is provided for supporting the finder 18 from the bracket 17 in such position that the optical axis of the finder and the optical axis of the camera shall lie in a common plane, such plane being indicated by reference characters 22 and 23, in Figs. 3 and 5. As is clearly shown in Fig. 5, the upper end portion of the bracket 17 is turned into oblique position parallel to the plane 22—23, being provided with a pivot pin 24 in the form of a machine screw secured to a suitable portion of the tubular body of the finder 18. The arrangement is such that as the finder 18 is swung about the machine screw 24 as an axis the optical axis of the finder is kept at all times in the plane 22—23, the pivot pin 24 being arranged at right angles to the plane 22—23 for insuring this desired result.

At its front end, the finder 18 is releasably clamped in position by means comprising a bracket 25 and a machine screw 26, as is best shown in Fig. 6. The bracket 25 is mounted upon the top face of the camera casing in parallel position with respect to the plane 22—23, being provided with an elongated recess 27 in its face, as is clearly shown in Figs. 6 and 7. A collar 28 carried by the front end portion of the finder 18 is provided with a lug 29 projecting therefrom so as to extend into the recess 27. As is clearly shown in Figs. 6 and 7, the bracket 25 is provided with a slot 30 in its outer face through which the machine screw 26 extends so as to engage a screw-threaded socket 31 in the lug 29 (see Fig. 6). The arrangement is such that the head portion of the machine screw 26 is adapted to tighten the lug 29 against the wall portion of the bracket 25 about the slot 30.

When an operator desires to use the camera 15 for a close-up exposure, the screw 26 is loosened so as to permit the front end portion of the finder 18 to move downwardly and inwardly toward the adjacent casing portion of the camera so as to change the point at which the optical axis of the finder intersects the optical axis of the camera. When this point of intersection of the optical axes has been shifted to the desired point close to the camera, the screw 26 is tightened against the bracket 25 for clamping the finder releasably in the desired adjusted position. As will be readily understood, by reason of the positioning of the pivot pin 24 obliquely as shown in Fig. 5, the swinging movement of the finder about the pivot pin changes the angular position of the finder with respect to the camera both horizontally and vertically, the optical axes being kept however in their desired relationship at all times in view of the fact that the swinging movement of the finder is confined to a movement in the plane determined by the optical axis of the camera and the optical axis of the finder.

For expediting the adjustment of the position of the finder 18 for meeting changing conditions, the bracket 25 is provided with graduations thereon, as is clearly shown in Fig. 4, adapted by reference to a suitable index at 32 on the lug 29 to show the point at which the finder should be locked in position. The graduations are preferably calibrated in feet, the graduation numbers representing in feet the distance ahead of the camera at which the optical axis of the finder intersects the optical axis of the camera.

It has been found in practice that with a finder and camera arranged as above described, an operator is enabled much more readily to obtain satisfactory results when shifting to and from close-up exposure work and is enabled much more satisfactorily to carry through routine exposure work even when there is no radical change being made in the type of work done. With the optical axis of the camera and the optical axis of the finder pointing always at the same spot, the parallax effect is minimized and a maximum of efficiency is brought about.

While the form and arrangement of parts as shown and described are preferred, the invention is not to be limited to such arrangement except so far as the claims may be so limited, it being understood that changes might well be made in the arrangement without departing from the spirit of the invention.

We claim:

1. In a mechanism of the type described, the combination of a camera, a finder arranged at a different level from that of the optical axis of the camera and at one side of said axis, and means movably connecting said finder with said camera and arranged so that as the finder is moved with respect to the camera it is swung into changed angular position both horizontally and vertically and so that the optical axis of the finder is kept in position to intersect the optical axis of the camera.

2. In a mechanism of the type described, the combination of a camera, a finder arranged above and near one side face of the camera with its optical axis lying in an obliquely positioned plane in which the optical axis of the camera also lies, means for pivotally connecting said camera and said finder together on an obliquely positioned axis arranged at right angles to said plane, and means for locking said finder releasably in adjusted angular position on the camera.

3. In a mechanism of the type described, the combination of a camera, an elongated finder therefor arranged above and near one side face of the camera with the optical axes of the camera and the finder lying in a common plane, means for pivotally connecting the rear end portion of the finder with said camera on an axis arranged at right angles to said plane, a bracket mounted on the camera adjacent to the front end portion of the finder with its face portion next to the finder arranged parallel to said plane, clamping means for releasably connecting said finder rigidly with said bracket at different adjusted positions vertically thereon, and graduations on said bracket and said finder calibrated in units of distance for indicating the point in front of the camera at which the optical axis of the finder will intersect the optical axis of the camera.

PHILMORE F. SPERRY.
PHILIP F. BRISKIN.
JACK BRISKIN.